United States Patent
Hasegawa

(10) Patent No.: US 9,226,107 B2
(45) Date of Patent: Dec. 29, 2015

(54) METHOD OF CONTROLLING MOBILE TERMINAL APPARATUS AND MOBILE TERMINAL APPARATUS

(71) Applicant: FUJITSU LIMITED, Kawasaki-shi, Kanagawa (JP)

(72) Inventor: Eiji Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 14/048,853

(22) Filed: Oct. 8, 2013

(65) Prior Publication Data

US 2014/0113662 A1 Apr. 24, 2014

(30) Foreign Application Priority Data

Oct. 24, 2012 (JP) ................................. 2012-234419

(51) Int. Cl.
*H04W 4/02* (2009.01)
*H04W 4/00* (2009.01)
*H04W 52/02* (2009.01)

(52) U.S. Cl.
CPC ............... *H04W 4/02* (2013.01); *H04W 4/006* (2013.01); *H04W 52/0261* (2013.01); *H04W 4/027* (2013.01)

(58) Field of Classification Search
CPC . H04W 52/00; H04W 52/02; H04W 52/0209; H04W 52/0225; H04W 52/0229; H04W 52/0232; H04W 52/0251; H04W 52/0254; H04W 52/0258; H04W 52/0261; H04W 52/0264; H04W 52/0274; H04W 52/028; H04W 88/02; H04W 24/02; H04W 4/02; H04W 64/00; H04B 1/1615; G01S 5/0252; G01C 21/20

USPC ........ 455/404.2, 418, 423, 425, 456.1–456.4, 455/456.6–457, 550.1, 572–574; 713/300, 713/320–324; 342/357.74

See application file for complete search history.

(56) References Cited

U.S. PATENT DOCUMENTS

| | | | |
|---|---|---|---|
| 6,426,719 B1 | 7/2002 | Nagareda et al. | |
| 8,332,665 B2 * | 12/2012 | Conroy et al. | ................. 713/300 |
| 8,862,715 B1 * | 10/2014 | Tom et al. | ..................... 709/223 |
| 2010/0159947 A1 * | 6/2010 | Imafuku | ..................... 455/456.1 |
| 2010/0255856 A1 * | 10/2010 | Kansal et al. | .............. 455/456.1 |
| 2011/0239026 A1 * | 9/2011 | Kulik | ............................ 713/324 |
| 2012/0190379 A1 * | 7/2012 | Hassan et al. | .............. 455/456.1 |
| 2012/0315928 A1 * | 12/2012 | Hashimoto et al. | ........ 455/456.6 |
| 2013/0253880 A1 * | 9/2013 | Joseph et al. | ................. 702/150 |

FOREIGN PATENT DOCUMENTS

| | | |
|---|---|---|
| JP | 2000-32519 | 12/2000 |
| JP | 2011-022115 | 2/2011 |
| JP | 2011-149860 | 8/2011 |

* cited by examiner

*Primary Examiner* — George Eng
*Assistant Examiner* — Umair Ahsan
(74) *Attorney, Agent, or Firm* — Oblon, McClelland, Maier & Neustadt, L.L.P.

(57) ABSTRACT

A method of controlling a mobile terminal apparatus includes selecting, using a processor, a sensor from a plurality of sensors installed on the mobile terminal apparatus based on both of power consumption for determining whether the mobile terminal apparatus has moved based on an output of at least any one of the sensors and power consumption for identifying a position of the mobile terminal apparatus, determining whether the mobile terminal apparatus has moved based on an output of the sensor selected in the selecting, and identifying a position of the mobile terminal apparatus when it is determined that the mobile terminal apparatus has moved in the determining.

9 Claims, 10 Drawing Sheets

| SENSOR | MOVEMENT-DETERMINATION FAILURE RATE |
|---|---|
| BASEBAND | 0.3 |
| PEDOMETER | 0.1 |
| WLAN | 0.3 |

| BASEBAND | PEDOMETER | BLUETOOTH | WLAN | MOVEMENT-DETERMINATION FAILURE RATE |
|---|---|---|---|---|
| ... | ... | ... | ... | ... |
| USE | USE | × | × | 0.1 |
| USE | × | USE | × | 0.12 |
| USE | × | × | USE | 0.12 |
| × | USE | × | USE | 0.08 |
| × | USE | × | USE | 0.08 |
| × | × | USE | USE | 0.15 |
| USE | USE | USE | × | 0.09 |
| USE | USE | × | USE | 0.01 |
| USE | × | USE | USE | 0.08 |
| ... | ... | ... | ... | ... |
| USE | USE | USE | USE | 0.005 |

| BASEBAND | PEDOMETER | BLUETOOTH | WLAN | AMOUNT OF POWER CONSUMPTION [mWs] |
|---|---|---|---|---|
| ... | ... | ... | ... | ... |
| USE | USE | × | × | 350 |
| USE | × | USE | × | 250 |
| USE | × | × | USE | 250 |
| × | USE | × | USE | 500 |
| × | USE | × | USE | 500 |
| × | × | USE | USE | 300 |
| USE | USE | USE | × | 550 |
| USE | USE | × | USE | 550 |
| USE | × | USE | USE | 350 |
| ... | ... | ... | ... | ... |
| USE | USE | USE | USE | 650 |

| SENSOR | MOVEMENT-DETERMINATION FAILURE RATE AT WALKING TIME | MOVEMENT-DETERMINATION FAILURE RATE AT IN-VEHICLE TIME |
|---|---|---|
| BASEBAND | 0.8 | 0.2 |
| PEDOMETER | 0.05 | 0.8 |
| WLAN | 0.5 | 0.1 |

METHOD OF CONTROLLING MOBILE TERMINAL APPARATUS AND MOBILE TERMINAL APPARATUS

CROSS-REFERENCE TO RELATED APPLICATION

This application is based upon and claims the benefit of priority from the prior Japanese Patent Application No. 2012-234419 filed on Oct. 24, 2012, the entire contents of which are incorporated herein by reference.

FIELD

The embodiments discussed herein are related to a method of controlling a mobile terminal apparatus and a mobile terminal apparatus.

BACKGROUND

In recent years, so-called positional services are becoming widespread. In the positional services, positional information of a mobile terminal apparatus is obtained using the Global Positioning System (GPS), a wireless local area network (WLAN), a baseband, and so on, and services depending on a position of the mobile terminal apparatus are provided.

Under the above-described circumstances, power consumption for positioning a mobile terminal apparatus (hereinafter referred to as a positioning power) is increasing. In particular, in the GPS, a bit rate of GPS signals from satellites is low (50 bps), and it takes about 30 minutes for receiving a GPS signal frame (1500 bits). Accordingly, compared with power consumption for obtaining state information of a mobile terminal apparatus by, for example, an acceleration, the number of steps, and so on, positioning power at the time of using GPS increases drastically. Also, in a WLAN and a baseband, a Basic Service Set Identifier (BSSID) and a cell-ID, which are obtained by a mobile terminal apparatus, have to be transmitted to a server, and thus compared with power consumption for obtaining state information of a mobile terminal apparatus, for example, an acceleration, the number of steps, and so on, positioning power increases drastically. Accordingly, it becomes important to reduce power consumption for positioning the mobile terminal apparatus.

For a mechanism to reduce power consumption, a control technique of a mobile terminal apparatus has been proposed in which, for example, a determination (hereinafter referred to as a "movement determination") is made of whether the mobile terminal apparatus has moved or not using sensors installed on the mobile terminal apparatus, and if the mobile terminal apparatus has not been moved, positioning is not carried out, and the positional information already obtained is used.

In the above control technique, a sensor consumes power for movement determination, but positioning power, which is greater than power consumption for movement determination, is reduced, and thus it is possible to suppress power consumption of the mobile terminal apparatus as a result.

Related-art techniques have been disclosed in Japanese Laid-open Patent Publication Nos. 2011-149860, 2000-352519, and 2011-022115.

SUMMARY

According to an aspect of the invention, a method of controlling a mobile terminal apparatus includes selecting, using a processor, a sensor from a plurality of sensors installed on the mobile terminal apparatus based on both of power consumption for determining whether the mobile terminal apparatus has moved based on an output of at least any one of the sensors and power consumption for identifying a position of the mobile terminal apparatus, determining whether the mobile terminal apparatus has moved based on an output of the sensor selected in the selecting, and identifying a position of the mobile terminal apparatus when it is determined that the mobile terminal apparatus has moved in the determining.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram of a movement-determination failure rate table according to the first embodiment;

FIG. 6 is a schematic diagram of a movement-determination failure rate table according to a second embodiment;

FIG. 7 is a schematic diagram of a power consumption table according to the second embodiment;

FIG. 9 is a schematic diagram of a movement-determination failure rate table according to the third embodiment.

DESCRIPTION OF EMBODIMENTS

In a control technique of a mobile terminal apparatus according to related-art techniques, a sensor determined in advance is used for movement determination for the mobile terminal apparatus. However, movement determination of a mobile terminal apparatus is largely dependent on a kind of and a combination of sensors used, or an operation state of the mobile terminal apparatus, and so on. Accordingly, if a sensor determined in advance is used, that is to say, if a sensor to be used is fixed, a failure often occurs in movement determination depending on a kind of and a combination of the sensors. If determined that a mobile terminal apparatus has moved in spite of the fact that the mobile terminal apparatus has not moved, for example, positioning is carried out uselessly, and the power consumption increases as a result.

First Embodiment

In the following, a description will be given of a first embodiment with reference to FIG. 1 to FIG. 5.

Hardware Configuration of Mobile Terminal Apparatus 100

A description will be given of a mobile terminal apparatus 100 according to the first embodiment. Here, Android (a registered trademark) is employed as an operating system (OS) to be installed in the mobile terminal apparatus 100. However, an embodiment of the present disclosure is not limited to this, and an OS other than Android may be employed. Also, although not limited in particular, the mobile terminal apparatus 100 according to the present embodiment is assumed to be a mobile information processing apparatus, for example a smart phone, a tablet PC, a digital camera, and so on.

Hardware of Mobile Terminal Apparatus 100

Figure 1:
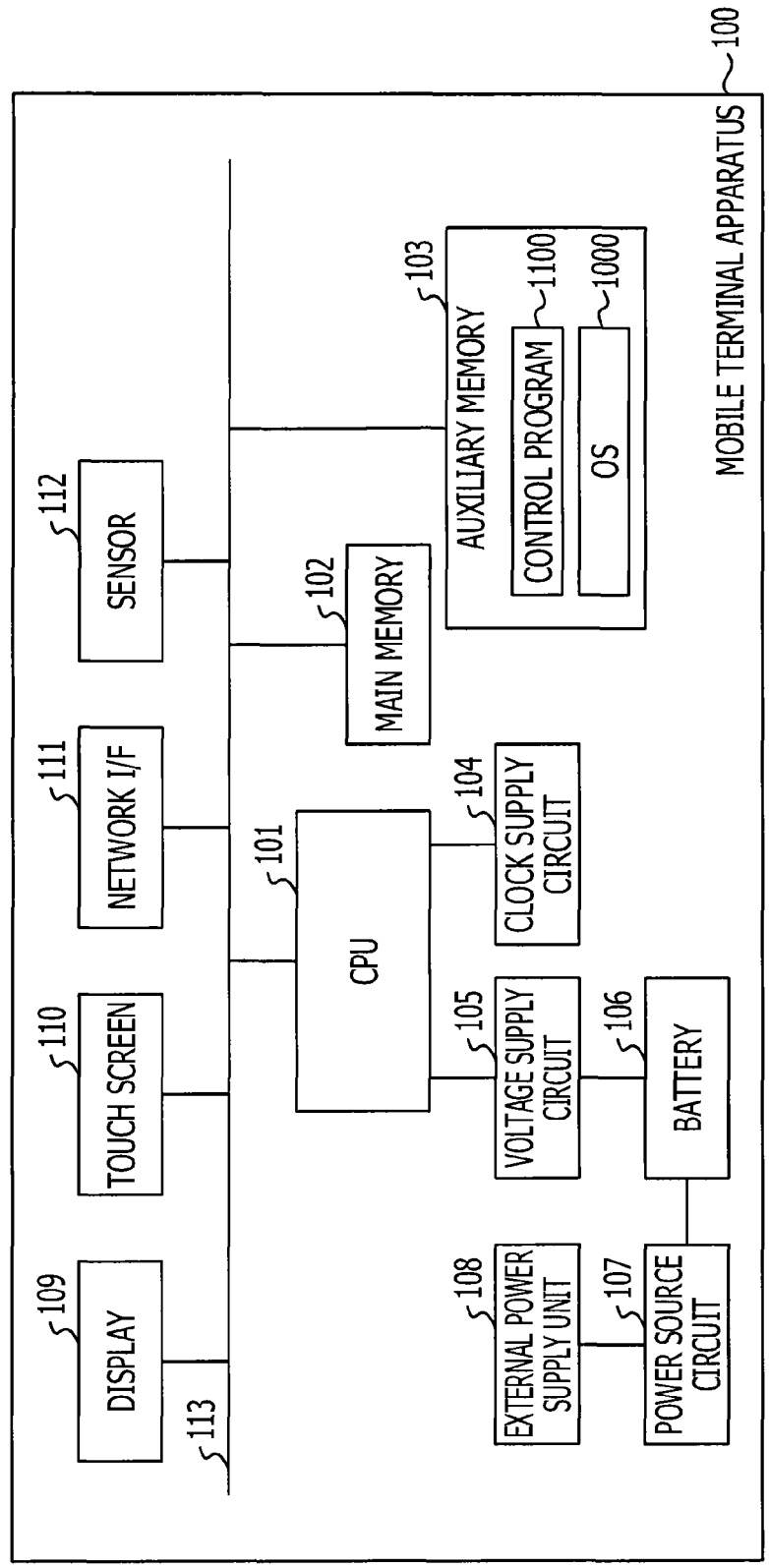
FIG. 1 is a schematic diagram of a hardware configuration of a mobile terminal apparatus according to a first embodiment.

FIG. 1 is a schematic diagram of a hardware configuration of the mobile terminal apparatus 100 according to the first embodiment.

As illustrated in FIG. 1, the mobile terminal apparatus 100 according to the present embodiment includes a central processing unit (CPU) 101, a main memory 102, an auxiliary memory 103, a clock supply circuit 104, a voltage supply circuit 105, a battery 106, a power source circuit 107, an external power supply unit 108, a display 109, a touch screen 110, a network interface (I/F) 111, and a sensor 112 as hardware modules. These hardware modules are mutually connected through a bus 113.

It is assumed that the CPU 101 is not a baseband large scale integrated (LSI), but is a processor that executes an application program. The CPU 101 is operated by a clock signal supplied from the clock supply circuit 104 and a voltage supplied from the voltage supply circuit 105, and controls various hardware modules of the mobile terminal apparatus 100. Further, the CPU 101 reads various programs stored in the auxiliary memory 103 into the main memory 102, and executes the various programs read in the main memory 102 so as to achieve various functions. Detailed descriptions will be given of the various functions later.

The main memory 102 stores the various programs to be executed by the CPU 101. Further, the main memory 102 is used as a work area of the CPU 101, and stores various kinds of data that is desired for processing by the CPU 101. For a main memory 102, for example, a random access memory (RAM), and so on may be used.

The auxiliary memory 103 stores various programs that operate the mobile terminal apparatus 100. For the various programs, for example, application programs that are executed by the mobile terminal apparatus 100, an OS 1000, which is an execution environment of the application programs, and so on are provided. The control program 1100 according to the present embodiment is also stored in the auxiliary memory 103. For the auxiliary memory 103, a non-volatile memory, for example a hard disk, a flash memory, and so on may be used.

The clock supply circuit 104 generates the clock signal to be supplied to the CPU 101. The clock supply circuit 104 may be achieved, for example, by a quartz oscillator that oscillates the clock signal and a real time clock (RTC).

The voltage supply circuit 105 generates a variable voltage to be supplied to the CPU 101 on the basis of the power supplied from the power source circuit 107. The voltage supply circuit 105 may be achieved by a voltage detector and a voltage regulator.

The battery 106 supplies power to the power source circuit 107. The battery 106 may be achieved, for example by a battery, such as a lithium-ion battery, and so on, and a battery protection integrated circuit (IC).

The power source circuit 107 supplies the power supplied from the battery 106 to various hardware modules of the mobile terminal apparatus 100 through a power source line (not illustrated in FIG. 1). In this regard, if an external power source (not illustrated in FIG. 1) is connected to the external power supply unit 108, the power source circuit 107 may supply the power supplied from the external power supply unit 108 to various hardware modules of the mobile terminal apparatus 100. The power source circuit 107 may be achieved, for example by a switching regulator and a voltage regulator.

The display 109 is controlled by the CPU 101, and displays image information to be presented to the user. The touch screen 110 is attached to the display 109, and receives input of positional information touched by a user's fingertip, a pen point, and so on.

The network I/F 111 is controlled by the CPU 101, and functions, for example as an interface of communication by a WLAN and a baseband.

The sensor 112 obtains the state information (state information of the user of the mobile terminal apparatus 100) of the mobile terminal apparatus 100. For the sensor 112, for example, a baseband, a pedometer, a WLAN, Bluetooth (a registered trademark), an accelerometer, a camera, an illuminance meter, a barometer, and so on may be used. In the case of using a pedometer, Bluetooth, an accelerometer, a camera, an illuminance meter, and a barometer as a sensor 112, a number of steps, a peripheral device of Bluetooth, an acceleration, an image, an illuminance, an atmospheric pressure are detected, respectively.

In this regard, a baseband here is handled as a sensor for detecting a cell-ID transmitted from a base station of, for example, 3G (3rd Generation), and so on, and a WLAN is handled as a sensor for detecting a BSSID transmitted from an access point. However, a baseband and a WLAN according to the present embodiment are sometimes used as a positioning mechanism in the same manner as the GPS.

Functional Blocks of Mobile Terminal Apparatus 100

Figure 2:
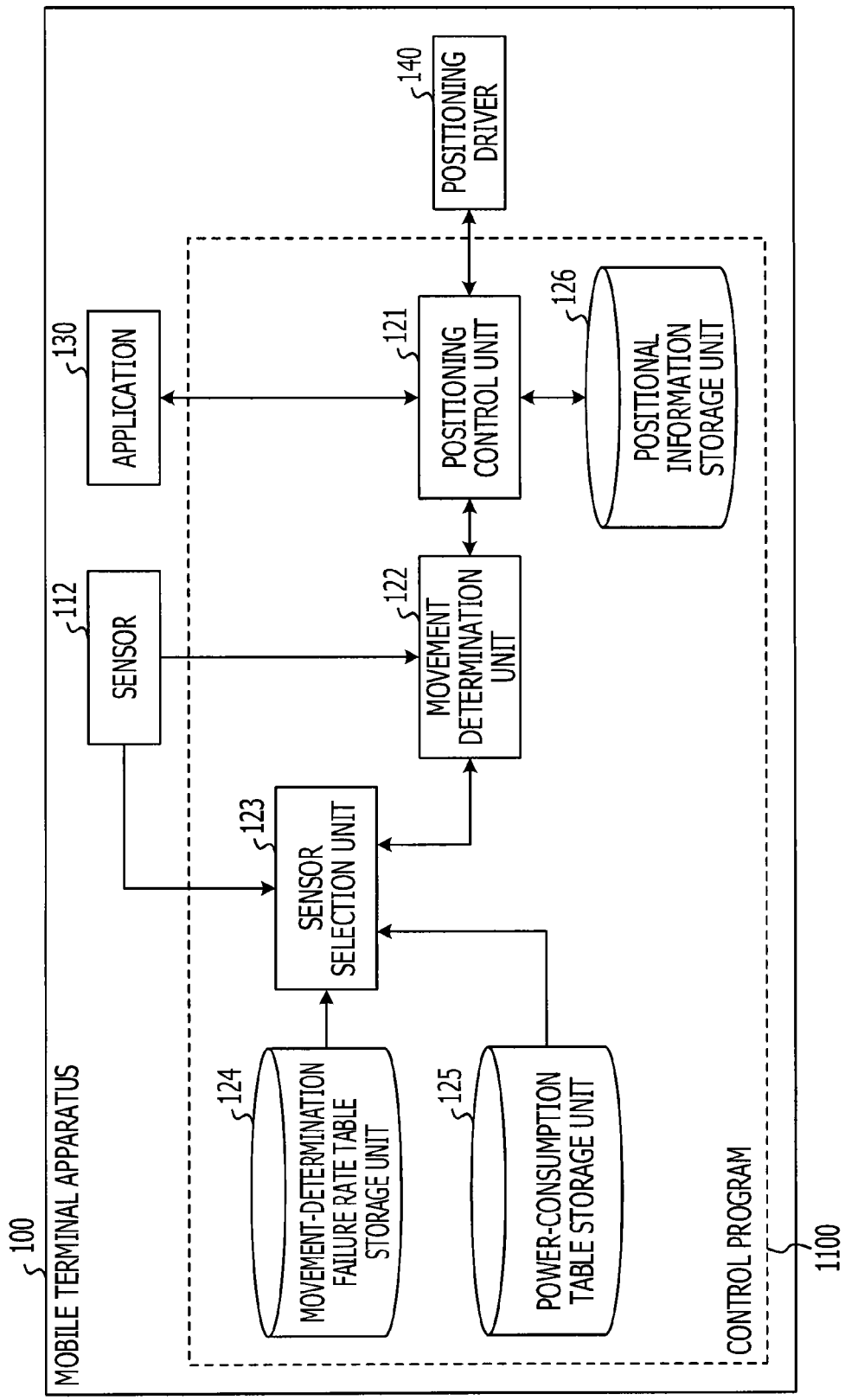
FIG. 2 is a schematic diagram of functional blocks of the mobile terminal apparatus according to the first embodiment.

FIG. 2 is a schematic diagram of functional blocks of the mobile terminal apparatus 100 according to the first embodiment.

As illustrated in FIG. 2, the mobile terminal apparatus 100 according to the present embodiment includes a positioning control unit 121, a movement determination unit 122, and a sensor selection unit 123.

Any one of the positioning control unit 121, the movement determination unit 122, and the sensor selection unit 123 is achieved by the CPU 101 reading the control program 1100 into the main memory 102, and executing the control program 1100 read into the main memory 102.

In this regard, an application 130 in FIG. 2 is an application (position use application) that uses positional information, and is achieved by the CPU 101 reading the application program into the main memory 102, and executing the application program read into the main memory 102. A positioning driver 140 in FIG. 2 is achieved by the CPU 101 reading the kernel of the OS 1000 into the main memory 102, and executing the application program read into the main memory 102.

Positioning Control Unit 121

The positioning control unit 121 gives an indication of whether the mobile terminal apparatus 100 has moved or not, that is to say, a movement determination to the movement determination unit 122 on the basis of a positioning request from the application 130. Further, the positioning control unit 121 obtains positional information of the mobile terminal apparatus 100 on the basis of the determination result by the movement determination unit 122, and notifies the positional information to the application 130. For example, if the determination result by the movement determination unit 122 is "moved", the positioning control unit 121 instructs the positioning driver 140 to perform positioning, and notifies the positional information obtained by the positioning driver 140 to the application 130. On the other hand, if the determination result by the movement determination unit 122 is "not moved", the positioning control unit 121 notifies the latest positional information stored in a positional information storage unit 126 to the application 130. In this regard, the latest positional information corresponds to the positional information obtained by the previous positioning.

Movement Determination Unit 122

The movement determination unit 122 gives an instruction of selection of the sensors 112 to be used for movement determination of the mobile terminal apparatus 100 to the sensor selection unit 123 with a trigger of an instruction from the positioning control unit 121. Further, the movement determination unit 122 carries out movement determination of the mobile terminal apparatus 100 using the sensor 112 selected by the sensor selection unit 123. Here, if the sensor selection unit 123 selects a plurality of the sensors 112, the movement determination unit 122 carries out movement determination of the mobile terminal apparatus 100 using all of the plurality of the sensors 112. Specifically, if a baseband, a pedometer, a WLAN, Bluetooth, a camera, an illuminance meter, a barometer, an accelerometer, and so on are selected as the sensors 112, the movement determination unit 122 carries out movement determination of the mobile terminal apparatus 100 on the basis of a change of cell-ID, a change in radio wave intensity, a change in the number of steps, a change in the BSSID obtained by scanning, a change of peripheral device of Bluetooth, a change of an image, a change in illuminance, a change in atmospheric pressure, a change in acceleration, respectively, or a combination of these.

Sensor Selection Unit 123

The sensor selection unit 123 selects sensors 112 to be used for movement determination of the mobile terminal apparatus 100, that is to say, sensors for use from the plurality of sensors 112 with a trigger of the instruction from the movement determination unit 122. Specifically, the sensor selection unit 123 selects a combination of the sensors 112 to be used for movement determination on the basis of the operation state of the sensors 112 (operation state of the mobile terminal apparatus 100) and a movement-determination failure rate table Ta and a power consumption table Tb. In this regard, the operation state of the sensors 112 is information of whether the individual sensors 112 are capable of sensing or not. For example, if a certain sensor 112 is in a state capable of sensing (in operation), the operation state becomes "OK", and if the sensor 112 is in a state not capable of sensing (in a sleeping state), the operation state becomes "NG". The sensor selection unit 123 checks the operation states of the individual sensors 112.

Movement-Determination Failure Rate Table Storage Unit 124

A movement-determination failure rate table storage unit 124 stores the movement-determination failure rate table Ta in which movement-determination failure rates of the individual sensors 112 are described. The movement-determination failure rate is a probability of failure at the time of carrying out movement determination of the mobile terminal apparatus 100 using the individual sensors 112. In this regard, the movement-determination failure rate is determined in advance, but may be determined in consideration of, for example, a probability of not moving in reality while determined that the sensor has moved, and a probability of determination that the sensor has not moved while the sensor has actually moved.

FIG. 3 is a schematic diagram of the movement-determination failure rate table Ta according to the first embodiment.

As illustrated in FIG. 3, in the movement-determination failure rate table Ta, the individual sensors 112 are tied to movement-determination failure rates. In the present embodiment, a baseband, a pedometer, and a WLAN are tied to movement-determination failure rates 0.3, 0.1, and 0.3, respectively. For example, if baseband is only used for movement determination of the mobile terminal apparatus 100, it is understood that the movement-determination failure rate becomes 0.3.

Power-Consumption Table Storage Unit 125

A power-consumption table storage unit 125 stores the power consumption table Tb in which power consumption of the individual sensors 112 are described. The power consumption is an amount of power that is consumed when movement determination of the mobile terminal apparatus 100 is carried out using the individual sensors 112.

Figure 4:
FIG. 4 is a schematic diagram of a power consumption table according to the first embodiment.

FIG. 4 is a schematic diagram of the power consumption table Tb according to the first embodiment.

As illustrated in FIG. 4, the power consumption table Tb ties the individual sensors 112 to average power consumption for movement detection. In the present embodiment, power consumption 1 [mW], 6 [mW], and 4 [mW] are tied to the baseband, the pedometer, and the WLAN, respectively. For example, in the case of using only the baseband for movement determination of the mobile terminal apparatus 100, the power consumption becomes 1 [mW].

Positional Information Storage Unit 126

The positional information storage unit 126 records positional information and precision information that are obtained by positioning carried out immediately before (most recently). For the positional information, for example, longitude information and latitude information are used. However, the positional information storage unit 126 may record not only the positional information and the precision information that are obtained by the positioning immediately before, but also may tie the positional information and the precision information that are obtained by the positioning carried out before that time to positioning time.

Sensor Selection Processing

Figure 5:
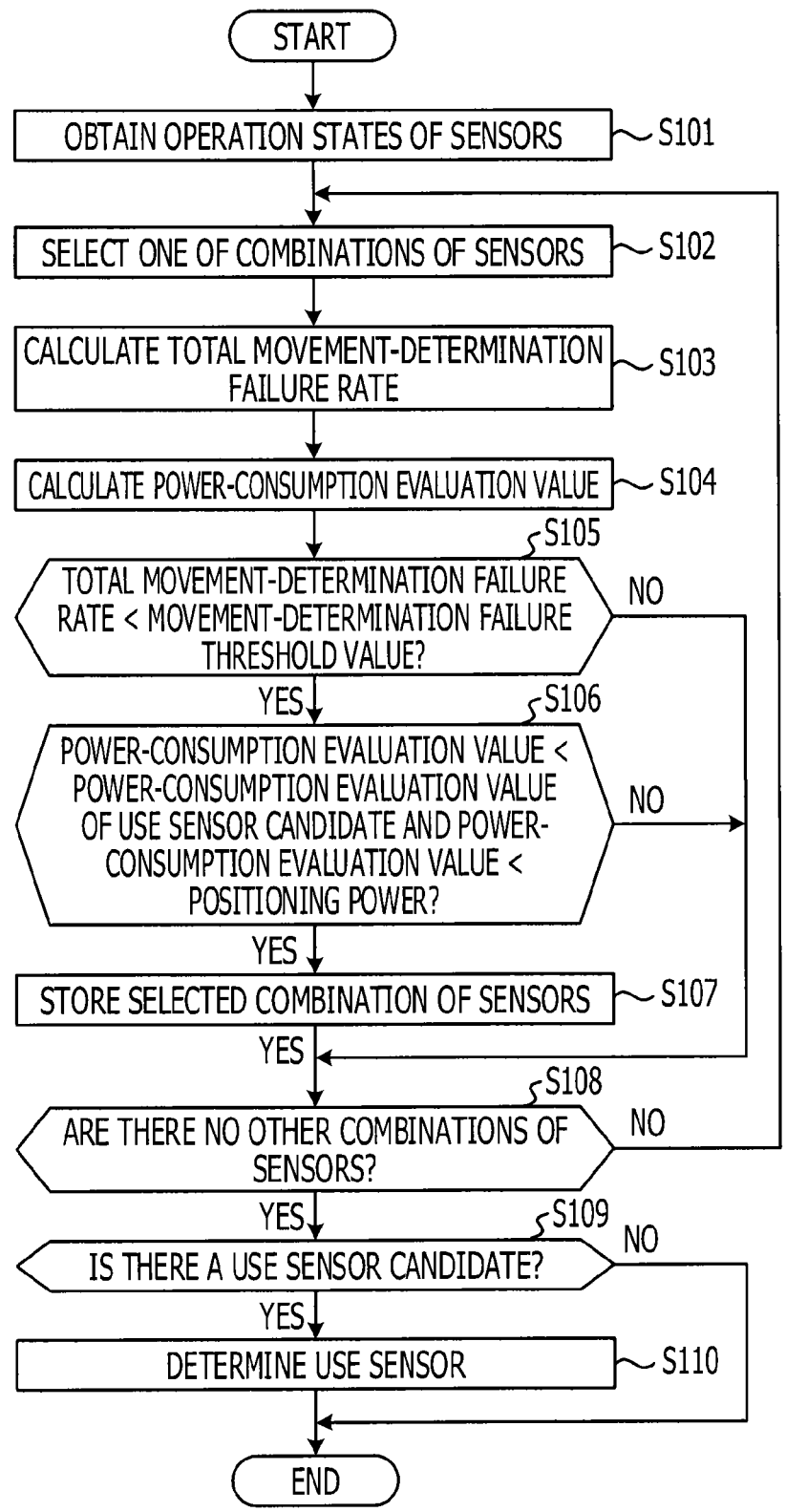
FIG. 5 is a flowchart of sensor selection processing according to the first embodiment.

FIG. 5 is a flowchart of sensor selection processing according to the first embodiment.

As illustrated in FIG. 5, the sensor selection unit 123 obtains the operation states of all of the plurality of sensors 112 (step S101) with a trigger of an instruction from the movement determination unit 122. For the operation state, "OK", which is capable of sensing, and "NG", which is not capable of sensing, are defined.

Next, the sensor selection unit 123 selects one combination out of all the combinations of the plurality of sensors 112 (step S102). For example, if there are three sensors 112, one combination is selected from seven combinations ($=_3C_1+_3C_2+_3C_3$).

Next, the sensor selection unit 123 calculates a movement-determination failure rate in the case of using all the sensors 112 of the selected combination, that is to say, a total movement-determination failure rate (step S103). The total movement-determination failure rate is a probability of failure in movement determination when all the sensors 112 of the selected combination are used. Specifically, the sensor selection unit 123 calculates the total movement-determination failure rate using the following expression (1).

$$f(\textit{t})\text{TOTAL MOVEMENT-DETERMINATION FAILURE RATE} = \Pi_{i=1}^{n}\text{"MOVEMENT-DETERMINATION FAILURE RATE OF SENSOR}_i \quad (1)$$

Next, the sensor selection unit 123 calculates a power-consumption evaluation value on the basis of the operation state of the sensor 112, the total movement-determination failure rate, and the positioning power (step S104). Specifically, the sensor selection unit 123 calculates the power-consumption evaluation value using the following expression (2).

$$\text{Power-consumption evaluation value} = \text{total movement-determination failure rate} \times \text{positioning power} + \text{increment of sensor power consumption} \quad (2)$$

In this regard, the positioning power is power to be used for positioning. In the present embodiment, it is assumed that the average positioning power is 40 [mW] on the assumption of GPS positioning. The increment of sensor power consumption is an increment of power consumption at the time of operating the sensor 112 in a sleeping state for movement determination of the mobile terminal apparatus 100. Accordingly, the sum total power consumption of the sensors 112 in a sleeping state (operation state is "NG") among the sensors 112 included in the selected combination becomes an increment of sensor power consumption. In this regard, in the case of using only the sensor 112 in operation for movement determination of the mobile terminal apparatus 100, an increase of power consumption will not occur.

Next, the sensor selection unit 123 determines whether the total movement-determination failure rate is less than the movement-determination failure threshold value determined in advance (step S105).

Here, if not determined that the total movement-determination failure rate is less than the movement-determination failure threshold value (No in step S105), it is estimated that the probability of failure in movement determination of the mobile terminal apparatus 100 is high. Accordingly, the sensor selection unit 112 throws away the selected combination of the sensors 112, and determines whether there is another combination of the sensors 112 or not (step S108).

On the other hand, if determined that the total movement-determination failure rate is less than the movement-determination failure threshold value (Yes in step S105), it is estimated that the probability of failure in movement determination of the mobile terminal apparatus 100 is low. Accordingly, the sensor selection unit 123 determines whether the power-consumption evaluation value of the selected combination of the sensors 112 is lower than the power-consumption evaluation value of a use sensor candidate, which is a combination of sensors 112 having the lowest power-consumption evaluation value, and whether the power-consumption evaluation value of the selected combination of the sensors 112 is lower than the positioning power (step S106).

Here, if not determined that the power-consumption evaluation value of the selected combination of the sensors 112 is lower than the power-consumption evaluation value of the combination of the sensors 112 which are use sensor candidates, and the power-consumption evaluation value of the selected combination of the sensors 112 is lower than the positioning power (No in step S106), the sensor selection unit 123 determines whether there are no combinations of the other sensors 112 or not (step S108).

On the other hand, if determined that the power-consumption evaluation value of the selected combination of the sensors 112 is lower than the power-consumption evaluation value of the combination of the sensors 112 which are use sensor candidates, and the power-consumption evaluation value of the selected combination of the sensors 112 is lower than the positioning power (Yes in step S106), the sensor selection unit 123 stores the selected combination of the sensors 112 as a use sensor candidate (step S107).

Next, the sensor selection unit 123 determines whether there are no other combinations of the sensors 112 or not (step S108).

Here, if determined that there are no other combinations of the sensors 112 (Yes in step S108), the sensor selection unit 123 determines whether there is a combination of the sensors 112 stored as a use sensor candidate (step S109).

Here, if determined that there is a combination of the sensors 112 stored as a use sensor candidate (Yes in step S109), the sensor selection unit 123 determines the combination of the sensors 112 stored as a use sensor candidate to be a use sensor to be used for movement determination (step S110).

On the other hand, if not determined that there is a combination of the sensors 112 stored as a use sensor candidate (No in step S109), the sensor selection unit 123 terminates the sensor selection processing.

Also, if not determined that there are no other combinations of the sensors 112 (No in step S108), that is to say, if determined that there is the other combination of the sensors 112, the sensor selection unit 123 selects one combination again out of all the combinations of the plurality of sensor 112 (step S102).

In this regard, the movement determination of the mobile terminal apparatus 100 is carried out until a positioning stop request is notified from the application 130, and the movement determination unit 122 stops the use of the sensors 112 for movement determination with a trigger of a positioning stop request.

SPECIFIC EXAMPLE 1

In the following, descriptions will be given of examples of calculation of the total movement-determination failure rate and the power-consumption evaluation value by the sensor selection unit 123 when the baseband and the WLAN are operating among the sensors 112 of the mobile terminal apparatus 100. Here, the movement-determination failure rates and the power consumption described in the movement-determination failure rate table Ta in FIG. 3, and the power consumption table Tb in FIG. 4, respectively are used. Also, it is assumed that the movement-determination failure threshold value is 0.1, and the positioning power is 2000 [mWs].

(A1) When only the baseband is selected as a combination of the sensors 112, the total movement-determination failure rate and the power-consumption evaluation value become as follows.

Total movement-determination failure rate=0.3

Power-consumption evaluation value=0.3×40+1=13

(A2) When only the pedometer is selected as a combination of the sensors 112, the total movement-determination failure rate and the power-consumption evaluation value become as follows.

Total movement-determination failure rate=0.1

Power-consumption evaluation value=0.1×40+6=10

(A3) When only the WLAN is selected as a combination of the sensors 112, the total movement-determination failure rate and the power-consumption evaluation value become as follows.

Total movement-determination failure rate=0.3

Power-consumption evaluation value=0.3×40+0=12

(A4) When the baseband and the pedometer are selected as a combination of the sensors 112, the total movement-determination failure rate and the power-consumption evaluation value become as follows.

Total movement-determination failure rate=0.3× 0.1=0.03

Power-consumption evaluation value=0.03×40+1+ 6=8.2

(A5) When the baseband and the WLAN are selected as a combination of the sensors 112, the total movement-determination failure rate and the power-consumption evaluation value become as follows.

Total movement-determination failure rate=0.3× 0.3=0.09

Power-consumption evaluation value=0.09×40+0=3.6

(A6) When the pedometer and the WLAN are selected as a combination of the sensors 112, the total movement-determination failure rate and the power-consumption evaluation value become as follows.

Total movement-determination failure rate=0.1× 0.3=0.03

Power-consumption evaluation value=0.03×40+ 50=7.2

(A7) When the baseband, the pedometer, and the WLAN are selected as a combination of the sensors 112, the total movement-determination failure rate and the power-consumption evaluation value become as follows.

Total movement-determination failure rate=0.3×0.1× 0.3=0.009

Power-consumption evaluation value=0.009×40+ 6=6.36

As described above, when the combination of the baseband and the WLAN is selected, it is understood that the total movement-determination failure rate becomes lower than the threshold value of the movement-determination failure rate, and the power-consumption evaluation value becomes the minimum. Accordingly, if the baseband and the WLAN are operating, the baseband and the WLAN ought to be selected as use sensors.

SPECIFIC EXAMPLE 2

In the following, descriptions will be given of examples of calculation of the total movement-determination failure rate and the power-consumption evaluation value by the sensor selection unit 123 when only the baseband is operating among the sensors 112 of the mobile terminal apparatus 100. Here, the movement-determination failure rates and the power consumption described in the movement-determination failure rate table Ta in FIG. 3, and the power consumption table Tb in FIG. 4, respectively are also used. Also, it is assumed that the movement-determination failure threshold value is 0.1, and the positioning power is 40[mW].

(B1) When only the baseband is selected as a combination of the sensors 112, the total movement-determination failure rate and the power-consumption evaluation value become as follows.

Total movement-determination failure rate=0.3

Power-consumption evaluation value=0.3×40+=12

Baseband sensor's power-consumption is not added because baseband is operating, so already on.

(B2) When only the pedometer is selected as a combination of the sensors 112, the total movement-determination failure rate and the power-consumption evaluation value become as follows.

Total movement-determination failure rate=0.1

Power-consumption evaluation value=0.1×40+6=10

(B3) When only the WLAN is selected as a combination of the sensors 112, the total movement-determination failure rate and the power-consumption evaluation value become as follows.

Total movement-determination failure rate=0.3

Power-consumption evaluation value=0.3×40+4=16

(B4) When the baseband and the pedometer are selected as a combination of the sensors 112, the total movement-determination failure rate and the power-consumption evaluation value become as follows.

Total movement-determination failure rate=0.3× 0.1=0.03

Power-consumption evaluation value=0.03×40+6=7.2

(B5) When the baseband and the WLAN are selected as a combination of the sensors 112, the total movement-determination failure rate and the power-consumption evaluation value become as follows.

Total movement-determination failure rate=0.3× 0.3=0.09

Power-consumption evaluation value=0.09×50+4=7.6

(B6) When the pedometer and the WLAN are selected as a combination of the sensors 112, the total movement-determination failure rate and the power-consumption evaluation value become as follows.

Total movement-determination failure rate=0.1× 0.3=0.03

Power-consumption evaluation value=0.03×50+6+ 4=11.2

(B7) When the baseband, the pedometer, and the WLAN are selected as a combination of the sensors 112, the total movement-determination failure rate and the power-consumption evaluation value become as follows.

Total movement-determination failure rate=0.3×0.1× 0.3=0.009

Power-consumption evaluation value=0.009×50+6+ 4=10.45

As described above, when the combination of the baseband and the pedometer is selected, it is understood that the total movement-determination failure rate becomes lower than the threshold value of the movement-determination failure rate, and the power-consumption evaluation value becomes the minimum. Accordingly, if the baseband is only operating, the baseband and the pedometer ought to be selected as use sensors.

According to the present embodiment, a combination of the sensors 112 to be used for movement determination of the mobile terminal apparatus 100 is determined in consideration of the operation states of the individual sensors 112, and the increments of the movement-determination failure rate and the power consumption. Accordingly, it is possible to suppress the occurrence of useless power consumption without decreasing a success rate of movement determination of the mobile terminal apparatus 100.

In this regard, in the present embodiment, at the time of calculating the power-consumption evaluation value, an increment of the sensor power consumption is used. However, the present disclosure is not limited to this. For example, the power-consumption evaluation value may be calculated on the basis of only the total movement-determination failure rate×positioning power. Also, at the time of calculating the power-consumption evaluation value, sensor power consumption may be used in place of an increment of the sensor power consumption. Further, a movement-determination success rate (=1−total movement-determination failure rate) may be used in place of a total movement-determination failure rate. In the case of using a movement-determination success rate, a combination of the sensors 112 that makes the power-consumption evaluation value the greatest ought to be selected.

Further, in the present embodiment, operating power of a positioning device is used as positioning power. However, the present disclosure is not limited. For example, positioning power in consideration of positioning frequency may be used. For example, if an operating frequency of GPS by a positioning request from the application 130 is 1/10 of the total time period, it is thought that power consumption of the positioning device becomes 1/10 in general. Accordingly, the positioning power one-tenth of the operating power of the positioning device may be used as the positioning power.

Also, in the present embodiment, movement determination is carried out when the power-consumption evaluation value is less that the positioning power. However, for example, when the power-consumption evaluation value is greater than the positioning power, the movement determination may not be carried out, and positioning may be carried out all the time.

Also, the GPS is used as a positioning method in the present embodiment. However, the WLAN and the baseband, and so on may be used in addition.

Second Embodiment

In the following, a description will be given of a second embodiment with reference to FIG. 6 and FIG. 7. Note that the descriptions will be omitted of the same configuration and functions as those of the first embodiment.

FIG. 6 is a schematic diagram of a movement-determination failure rate table Tc according to the second embodiment.

As illustrated in FIG. 6, the movement-determination failure rate table Tc according to the present embodiment describes a movement-determination failure rate for each combination of the sensors 112. That is to say, the movement-determination failure rate according to the present embodiment is a probability of failure when movement determination of the mobile terminal apparatus 100 is carried out using combinations of the sensors 112.

FIG. 7 is a schematic diagram of a power consumption table Td according to the second embodiment.

As illustrated in FIG. 7, in the power consumption table Td according to the present embodiment, power consumption is described for each combination of the sensors 112. That is to say, the power consumption according to the present embodiment is an amount of power consumed when movement determination of the mobile terminal apparatus 100 is carried out using the combinations of the sensors 112.

SPECIFIC EXAMPLE

In the following, descriptions will be given of examples of calculation of the total movement-determination failure rate and the power-consumption evaluation value by the sensor selection unit 123 when the baseband and the WLAN are operating among the sensors 112 of the mobile terminal apparatus 100. Here, the movement-determination failure rates and the power consumption described in the movement-determination failure rate table Tc in FIG. 6 and the power consumption table Td in FIG. 7 are used, respectively. Also, it is assumed that the movement-determination failure threshold value is 0.1, and the positioning power is 40 [mW].

(C1) When the baseband and the WLAN are selected as a combination of the sensors 112, the movement-determination failure rate and the power-consumption evaluation value become as follows.

Movement-determination failure rate=0.12

Power-consumption evaluation value=0.12×40+ (5−5)=240

(C2) When the baseband, the pedometer, and the WLAN are selected as a combination of the sensors 112, the movement-determination failure rate and the power-consumption evaluation value become as follows.

Movement-determination failure rate=0.01

Power-consumption evaluation value=0.01×40+(11− 5)=320

(C3) When the baseband, the pedometer, the Bluetooth, and the WLAN are selected as a combination of the sensors 112, the movement-determination failure rate and the power-consumption evaluation value become as follows.

Movement-determination failure rate=0.08

Power-consumption evaluation value=0.08×40+ (7−5)=260

Here, only three kinds of combinations of the sensors 112 are described. However, the other combinations ought to be calculated in the same manner.

As described above, when the combination of the baseband, the Bluetooth, and the WLAN is selected, it is understood that the movement-determination failure rate becomes lower than the threshold value of the movement-determination failure rate, and the power-consumption evaluation value becomes the minimum. Accordingly, if the baseband and the WLAN are operating, the combination of the baseband, the Bluetooth, and the WLAN ought to be selected as use sensors.

In this regard, here, although the Bluetooth in a sleeping state is started, the power-consumption evaluation value is low. This is because the Bluetooth and the WLAN are packaged in a combo chip. In this manner, for example, depending on a packaging state, a difference sometimes occurs between the power-consumption evaluation value of a combination of a plurality of sensors 112 and the power-consumption evaluation value calculated by the movement-determination failure rates of the individual sensors 112. However, by the present embodiment, it is possible to calculate more precise power-consumption evaluation value.

Third Embodiment

In the following, a description will be given of a third embodiment with reference to FIGS. 8 to 10. Note that descriptions will be omitted of the same configuration and functions as those of the first embodiment.

Functional Blocks of Mobile Terminal Apparatus 100M

Figure 8:
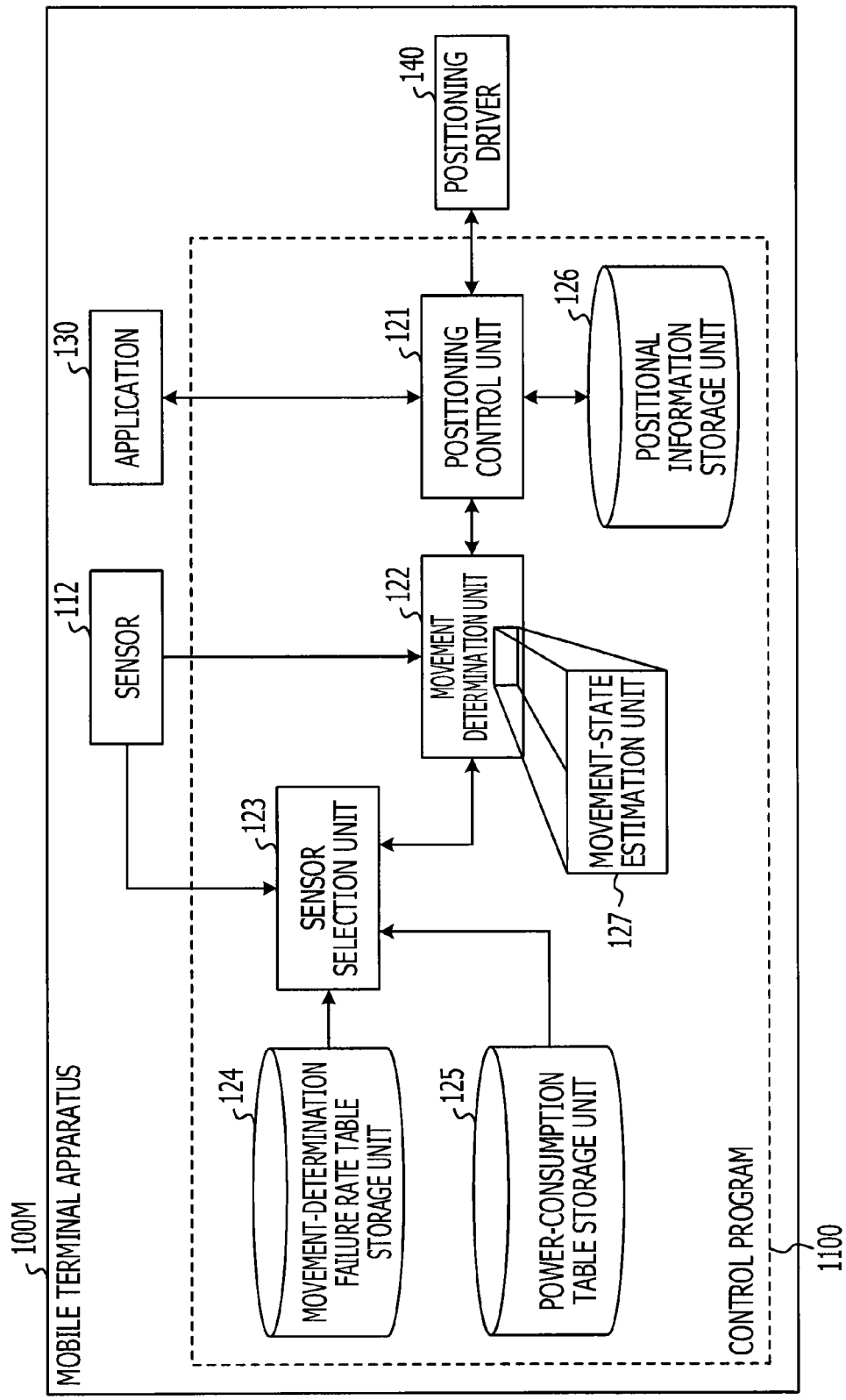
FIG. 8 is a schematic diagram of functional blocks of a mobile terminal apparatus according to a third embodiment.

FIG. 8 is a schematic diagram of the functional blocks of the mobile terminal apparatus 100M according to the third embodiment.

As illustrated in FIG. 8, the movement determination unit 122 according to the present embodiment includes a movement-state estimation unit 127. The movement-state estimation unit 127 estimates whether the movement state of the mobile terminal apparatus 100M (of the user) is a walking state or an in-vehicle state on the basis of the detection result by the sensor 112 and the determination result by the movement determination unit 122. For example, although there is no change in the count value (the number of steps) of the pedometer in operation, if determined as "have moved", it is estimated that the user of the mobile terminal apparatus 100M is in a vehicle. The movement-state estimation unit 127 holds movement states as the individual state probabilities estimated from the sensors 112. For example, the movement-state estimation unit 127 holds the probability that the movement state of the user is walking as a walking-state probability, and the probability that the movement state of the user is in a vehicle as an in-vehicle state probability.

The sensor selection unit 123 according to the present embodiment selects sensors 112 to be used for movement determination of the mobile terminal apparatus 100M, that is to say, sensors for use from the plurality of sensors 112 on the basis of the estimation result by the movement-state estimation unit 127 and the movement-determination failure rate table Te.

Specifically, the sensor selection unit 123 calculates the total movement-determination failure rate on the basis of the walking-state probability and the in-vehicle state probability that are determined by the movement-state estimation unit 127 for each estimation result using the following expression (3).

$$\text{TOTAL MOVEMENT-DETERMINATION FAILURE RATE} = \text{WALKING-STATE PROBABILITY} \times \prod_{i=1}^{n} \text{MOVEMENT-DETERMINATION FAILURE RATE OF SENSOR}_i + \text{IN-VEHICLE STATE PROBABILITY} \times \prod_{i=1}^{n} \text{MOVEMENT-DETERMINATION FAILURE RATE OF SENSOR}_i \quad (3)$$

Note that if it is difficult to estimate the movement state, both of the walking-state probability and the in-vehicle state probability are set to 0.5.

Further, the sensor selection unit 123 calculates the power-consumption evaluation value on the basis of the total movement-determination failure rate using the above-described expression (2).

And the sensor selection unit 123 selects a combination of the sensors 112 to be used for movement determination of the mobile terminal apparatus 100M on the basis of the operation states of the sensors 112 (the operation state of the mobile terminal apparatus 100M), the total movement-determination failure rate, and the power-consumption evaluation value.

FIG. 9 is a schematic diagram of the movement-determination failure rate table Te according to the third embodiment.

As illustrated in FIG. 9, the movement-determination failure rate table Te according to the present embodiment describes a each movement-determination failure rate of each of the sensors 112 for each movement state. For example, in the case of the pedometer, the movement-determination failure rate at the time of walking is set to 0.05, and the movement-determination failure rate at the time of in-vehicle is set to 0.8. A pedometer is suitable for movement detection in a walking state, but is not suitable for movement detection in an in-vehicle state, and thus the movement-determination failure rate at the time of walking is set to low, and the movement-determination failure rate at the time of in-vehicle is set to high.

Sensor Update Processing

Figure 10:
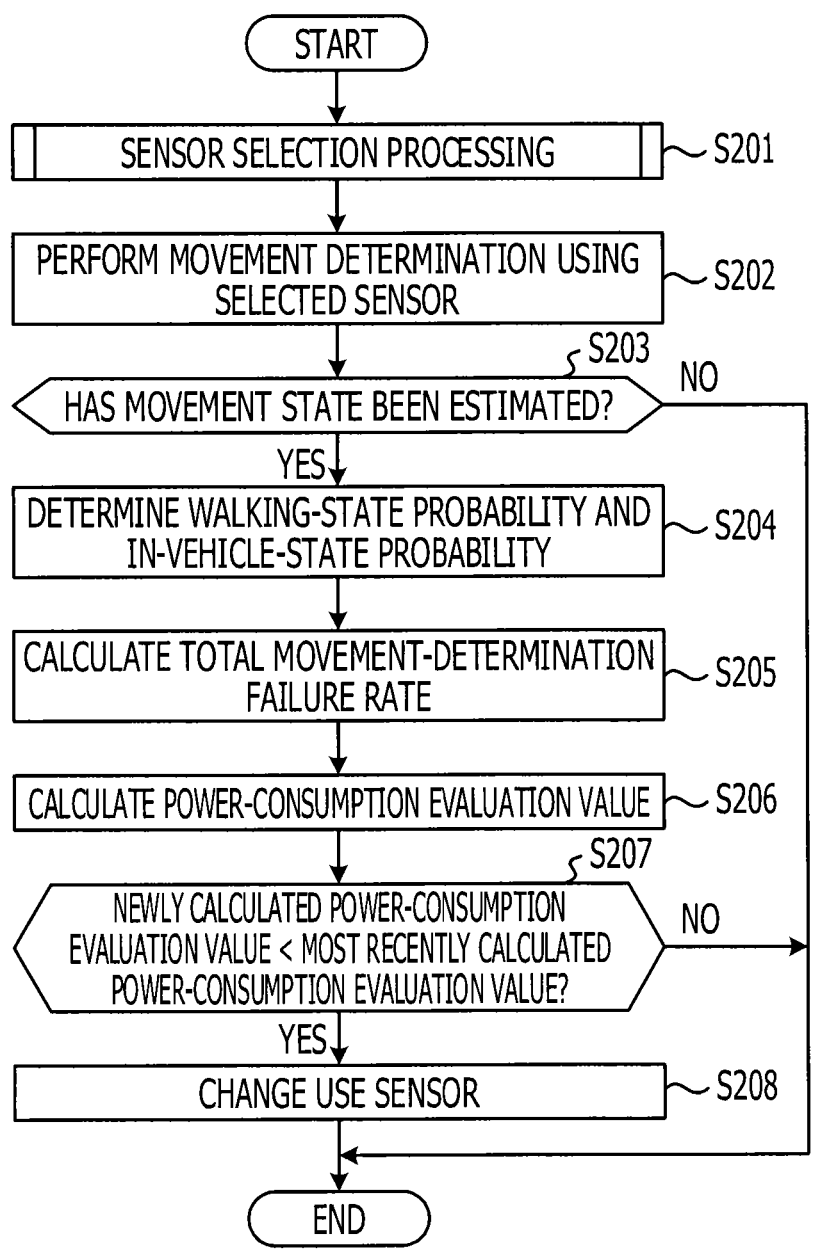
FIG. 10 is a flowchart of sensor update processing according to the third embodiment.

FIG. 10 is a flowchart of sensor update processing according to the third embodiment.

As illustrated in FIG. 10, first, the sensor selection unit 123 performs sensor selection processing according to the first embodiment using the expression (3) in place of the expression (1) (step S201). Here, it is assumed that both of the walking-state probability and the in-vehicle state probability are set to 0.5 on the assumption that it is difficult to estimate the movement state.

Next, the movement determination unit 122 carries out the movement determination of the mobile terminal apparatus 100M using the sensors 112 selected by the sensor selection unit 123 (step S202).

Next, the movement-state estimation unit 127 obtains positional information from the positioning driver 140 or the positional information storage unit 126 on the basis of the result of the movement determination, notifies the positional information to the application 130, and further, determines whether it has bee possible to estimate movement state of the mobile terminal apparatus 100M or not (step S203).

Here, if not determined that it has bee possible to estimate the movement state (No in step S203), the movement-state estimation unit 127 terminates the sensor update processing without updating the sensors 112 to be used for the movement determination of the mobile terminal apparatus 100M.

On the other hand, if determined that it has bee possible to estimate the movement state (Yes in step S203), the movement-state estimation unit 127 obtains the walking-state probability and the in-vehicle state probability that are tied to the movement state as an estimation result (step S204). In the present embodiment, it is assumed that in-vehicle state is estimated, and thus the walking-state probability is 0.1, and the in-vehicle state probability is 0.9.

Next, the sensor selection unit 123 calculates the total movement-determination failure rate on the basis of the walking-state probability and the in-vehicle state probability that are obtained by the movement-state estimation unit 127 using the above-described expression (3) (step S205).

Next, the sensor selection unit 123 calculates the power-consumption evaluation value on the basis of the total movement-determination failure rate using the above-described expression (2) (step S206).

Next, the sensor selection unit 123 determines whether a newly calculated power-consumption evaluation value is less than the power-consumption evaluation value calculated immediately before (most recently) or not (step S207).

Here, if not determined that the newly calculated power-consumption evaluation value is less than the power-consumption evaluation value calculated immediately before (No in step S207), the sensor selection unit 123 terminates the sensor update processing without updating the sensors 112 to be used for the movement determination of the mobile terminal apparatus 100M.

On the other hand, if determined that the newly calculated power-consumption evaluation value is less than the power-consumption evaluation value calculated immediately before (Yes in step S207), the sensor selection unit 123 updates the sensors 112 to be used for the movement determination to newly selected sensors 112 (step 208).

Specific Example 1 in the Case that Estimation of Movement State is not Possible In the following, descriptions will be given of examples of calculation of the total movement-determination failure rate and the power-consumption evaluation value by the sensor selection unit 123 when the baseband and the WLAN are operating among the sensors 112 of the mobile terminal apparatus 100M. Here, the movement-determination failure rates described in the movement-determination failure rate table Te in FIG. 9 are used. Also, it is assumed that the movement-determination failure threshold value is 0.1, and the positioning power is 40 [mW]. In the present specific example 1, it is assumed that estimation of movement state is not possible, and thus both of the movement state walking-state probability and the in-vehicle state probability are 0.5.

(D1) When the baseband and the WLAN are selected as a combination of the sensors 112, the total movement-determination failure rate and the power-consumption evaluation value become as follows.

Total movement-determination failure rate=0.5×(0.8× 0.5)+0.5×(0.2×0.1)=0.21

Power-consumption evaluation value=0.21×40+4=26

(D2) When the baseband, the pedometer, and the WLAN are selected as a combination of the sensors 112, the total movement-determination failure rate and the power-consumption evaluation value become as follows.

Total movement-determination failure rate=0.5×(0.8× 0.05×0.5)+0.5(0.2×0.8×0.1)=0.018

Power-consumption evaluation value=0.018×40+6=

As described above, in the case that estimation of movement state is not possible, when the combination of the baseband, the pedometer, and the WLAN is selected, it is understood that the movement-determination failure rate becomes lower than the threshold value of the movement-determination failure rate, and the power-consumption evaluation value becomes the minimum. Accordingly, if the baseband and the WLAN are operating, and estimation of movement state is not possible, the combination of the baseband, the pedometer, and the WLAN ought to be selected as use sensors.

Specific Example 2 in the Case that Estimation of Movement State was possible

In the following, descriptions will be given of examples of calculation of the total movement-determination failure rate and the power-consumption evaluation value by the sensor selection unit 123 when the baseband and the WLAN are operating among the sensors 112 of the mobile terminal apparatus 100M. Here, the movement-determination failure rates described in the movement-determination failure rate table Te in FIG. 9 are used. Also, it is assumed that the movement-determination failure threshold value is 0.1, and the positioning power is 2000 [mWs]. In the present specific example 2, it is assumed that estimation of movement state has been possible, and thus the walking-state probability is 0.1, and the in-vehicle state probability is 0.9.

(E1) When the baseband and the WLAN are selected as a combination of the sensors 112, the total movement-determination failure rate and the power-consumption evaluation value become as follows.

Total movement-determination failure rate=0.1×(0.8× 0.5)+0.9×(0.2×0.1)=0.058

Power-consumption evaluation value=0.058×40+ 0=2.32

(E2) When the baseband and the pedometer are selected as a combination of the sensors 112, the total movement-determination failure rate and the power-consumption evaluation value become as follows.

Total movement-determination failure rate=0.1×(0.8× 0.05×0.5)+0.9(0.2×0.8×0.1)=0.0164

Power-consumption evaluation value=0.0164×40+ 6=8.98

As described above, in the case that estimation of movement state is possible, when the combination of the baseband, and the WLAN is selected, it is understood that the movement-determination failure rate becomes lower than the threshold value of the movement-determination failure rate, and the power-consumption evaluation value becomes the minimum. Accordingly, if the baseband and the WLAN are operating, and estimation of movement state is possible, the combination of the baseband and the WLAN ought to be selected as use sensors.

By the present embodiment, a combination of the sensors 112 to be used for movement determination is selected in consideration of the movement state of the mobile terminal apparatus 100M. Accordingly, it is possible to carry out movement determination in accordance with the movement state of the mobile terminal apparatus 100M. As a result, it is possible to suppress the occurrence of useless power consumption further.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling a mobile terminal apparatus, the method comprising:
    selecting, using a processor, a sensor from a plurality of sensors installed on the mobile terminal apparatus based on both of power consumption for determining whether the mobile terminal apparatus has moved based on an output of at least any one of the sensors and power consumption for identifying a position of the mobile terminal apparatus;
    determining whether the mobile terminal apparatus has moved based on an output of the sensor selected in the selecting; and
    identifying a position of the mobile terminal apparatus when the determining determines that the mobile terminal apparatus has moved, wherein
    the selecting selects the sensor from the sensors based on an index indicating a success rate or failure rate of the determining of whether the mobile terminal apparatus has moved based on the output of at least any one of the sensors;
    the selecting selects the sensor from the sensors based on both of first information and second information stored in a memory, the first information associating at least any one of the sensors with power consumption for determining whether the mobile terminal apparatus has moved based on the output of at least any one of the sensors, the second information associating at least any one of the sensors with the index; and the first information associates at least two of the sensors with power consumption arising upon determining whether the mobile terminal apparatus has moved based on outputs of the at least two of the sensors operated simultaneously.

2. The method according to claim 1, wherein
the selecting selects the sensor from the sensors based on both of operation states of the sensors and power consumption for determining whether the mobile terminal apparatus has moved based on an output of each of the sensors.

3. The method according to claim 2, wherein
the selecting selects the sensor from the sensors based on information indicating an increase of power consumption arising upon determining whether the mobile terminal apparatus has moved based on an output of a sensor of which the operation state is non-active among the sensors.

4. The method according to claim 1, wherein
the selecting selects the sensor from the sensors based on a movement state of the mobile terminal apparatus.

5. The method according to claim 1, the method further comprising:
estimating a movement state of the mobile terminal apparatus based on both of a determination result of whether the mobile terminal apparatus has moved and the output of the sensor selected in the selecting.

6. The method according to claim 1, wherein
the selecting selects the sensor from the sensors based on a positioning request from an application.

7. The method according to claim 1, the method further comprising:
identifying a first subset of the sensors and a second subset of the sensors, the second subset including at least one sensor different from the first subset;
calculating a first parameter based on both of power consumption for determining whether the mobile terminal apparatus has moved based on an output of the first subset and an index indicating a success rate or a failure rate of determining whether the mobile terminal apparatus has moved based on the output of the first subset; and
calculating a second parameter based on both of power consumption for determining whether the mobile terminal apparatus has moved based on an output of the second subset and an index indicating a success rate or a failure rate of determining whether the mobile terminal apparatus has moved based on the output of the second subset, wherein
the selecting selects, as the sensor, the first subset or the second subset based on a comparison between the first parameter and the second parameter.

8. A non-transitory computer-readable medium that stores a control program of a mobile terminal apparatus, the control program causing the mobile terminal apparatus to execute a procedure comprising:
selecting a sensor from a plurality of sensors installed on the mobile terminal apparatus based on both of power consumption for determining whether the mobile terminal apparatus has moved based on an output of at least any one of the sensors and power consumption for identifying a position of the mobile terminal apparatus;
determining whether the mobile terminal apparatus has moved based on an output of the sensor selected in the selecting; and
identifying a position of the mobile terminal apparatus when the determining determines that the mobile terminal apparatus has moved, wherein
the selecting selects the sensor from the sensors based on an index indicating a success rate or failure rate of the determining of whether the mobile terminal apparatus has moved based on the output of at least any one of the sensors;
the selecting selects the sensor from the sensors based on both of first information and second information stored in a memory, the first information associating at least any one of the sensors with power consumption for determining whether the mobile terminal apparatus has moved based on the output of at least any one of the sensors, the second information associating at least any one of the sensors with the index; and
the first information associates at least two of the sensors with power consumption arising upon determining whether the mobile terminal apparatus has moved based on outputs of the at least two of the sensors operated simultaneously.

9. A mobile terminal apparatus comprising:
a processor configured to:
select a sensor from a plurality of sensors installed on the mobile terminal apparatus based on both of power consumption for determining whether the mobile terminal apparatus has moved based on an output of at least any one of the sensors and power consumption for identifying a position of the mobile terminal apparatus;
determine whether the mobile terminal apparatus has moved based on an output of the selected sensor; and
identify a position of the mobile terminal apparatus when the determination determines that the mobile terminal apparatus has moved, wherein
the selection includes selecting the sensor from the sensors based on an index indicating a success rate or failure rate of the determination of whether the mobile terminal apparatus has moved based on the output of at least any one of the sensors;
the selection selects the sensor from the sensors based on both of first information and second information stored in a memory, the first information associating at least any one of the sensors with power consumption for determining whether the mobile terminal apparatus has moved based on the output of at least any one of the sensors, the second information associating at least any one of the sensors with the index; and
the first information associates at least two of the sensors with power consumption arising upon determining whether the mobile terminal apparatus has moved based on outputs of the at least two of the sensors operated simultaneously.

* * * * *